Inventor
DAVID O. CLAYDEN
By Stevens, Davis, Miller & Mosher
Attorneys

Jan. 18, 1955 D. O. CLAYDEN 2,700,155

ELECTRICAL SIGNALING SYSTEM

Filed April 19, 1954 2 Sheets-Sheet 2

Inventor
DAVID O. CLAYDEN
By Stevens, Davis, Miller & Mosher
Attorneys

United States Patent Office 2,700,155

Patented Jan. 18, 1955

2,700,155

ELECTRICAL SIGNALING SYSTEM

David Oswald Clayden, Heston, England, assignor to National Research Development Corporation, London, England, a British corporation Application April 19, 1954, Serial No. 424,141

Claims priority, application Great Britain April 20, 1953

4 Claims. (Cl. 340—347)

The present invention relates to electrical signalling systems and is particularly concerned with serial-mode binary digital signal trains in which the binary digits 1 and 0 are represented by two different types of digit signal, each digit signal in the signal train occupying an allocated period, which will be referred to as a digit period.

The invention is concerned with a particular type of binary digital signalling system in which each 1 type binary signal is in a first form for the first half of its digit period and in a second form for the second half of its digit period while each 0 type binary digit signal is in the second form for the first half of its digit period and in the first form for the second half of its digit period. An example, of such a signalling system is described in Patent Specification No. 146,446, filed February 27, 1950 in which each digit signal has a voltage waveform which changes from a first level to a second level at the middle of each digit period, or vice versa in accordance with the type of binary digit being represented.

In order to convert digit signals in this form into digit signals in more normal forms in which they may be employed to operate various circuit elements such as gate circuits and triggers which are common to electrical digital signalling systems, the form of each of these digit signals must be determined during a known particular half of its digit period, as a 1 type digit signal during its first half digit period is the same as a 0 type digit signal during its second half digit period, and vice versa. The particular half digit period chosen must therefore be known throughout a sequence of readings, otherwise the type of digit being represented cannot be determined.

In prior arrangements in which the digit periods are set by a master timing device or clock pulse generator the timing or clock pulses from this device can be readily used to identify a particular half of a digit period and control a reading equipment to interpret the form of the digit signal during this half of the digit period.

The present invention is concerned with arrangements in which there are no timing pulses available or any similar means for identifying the digit periods.

It is an object of the present invention to provide an arrangement for identifying the digit periods in a serial train of digit signals of the type described from the train of digit signals itself.

According to the present invention, an electrical signalling arrangement comprises a source of a serial train of binary digit signals in which each 1 type binary digit signal is in a first form for the first half of its digit period and is in a second form for the second half of its digit period while each 0 type digit signal is in the second form for the first half of its digit period and is in the first form for the second half of its digit period, means for deriving a triggering pulse from the train of digit signals whenever the signal changes from one form to the other form, a trigger circuit arranged to be set by the next triggering pulse received after it has reset, to remain set for a time period which is more than half and less than a whole digit period and then to reset, and means for deriving clock pulses from an output of the trigger circuit which are in a known time relationship to each digit period after there has been two successive digit signals which are of different types.

In order to ensure that the clock pulses for identifying the digit periods are in a correct known time relationship at the beginning of a train of information-bearing digit signals it may be necessary to provide, ahead of the information-bearing train, a special train having at least two successive digit signals which are of different types.

Binary digit signals of the composite type described which are in one form for one half of their digit period and in another form for the other half find particular use in magnetic recording systems as these digit signals may be recorded by balanced currents applied to the magnetic recording heads which write the digit signals on to the recording medium. Arrangements according to the present invention are useful in digital computers having magnetic digital stores in which the stored digit signals are of the composite type described and are required to be read out of the magnetic store in a form in which they can operate circuit elements common to digital computers such as trigger and staticisor circuits and various types of gate circuits.

Circuit arrangements according to the invention, and additional circuit arrangements according to further features thereof to identify the end of special synchronising patterns of digit signals which are arranged to precede a signal message to ensure that the arrangement is working correctly, will now be described with reference to the accompanying drawings, in which:

Figure 1 is a schematic circuit diagram of one possible arrangement;

Figures 2(*a*) to 2(*e*) are voltage waveforms illustrating the action of the circuit shown in Figure 1;

Figure 1:
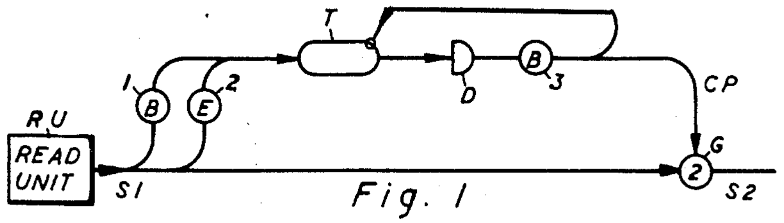
Figure 4:
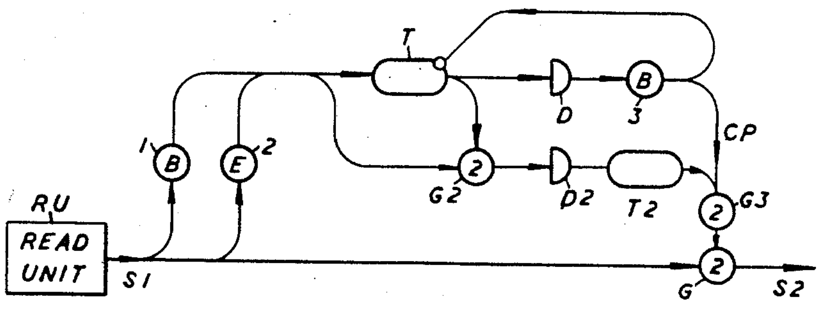
Figure 4 is a schematic circuit diagram of an arrangement involving additional circuits in order to identify the end of a special synchronising pattern of digit signals preceding a message; while Figures 5(*a*) to 5(*h*) are voltage waveforms occurring at various parts of the circuit shown in Figure 4.

In Figures 1 and 4 use has been made of the Turing notation for representing electronic circuit elements common to the digital computer art. This notation is fully described in patent application No. 202,615, now Patent No. 2,682,632, dated August 17, 1954. The delay units D and D2 are represented as "D's" in accordance with the latest convention.

Figure 2:
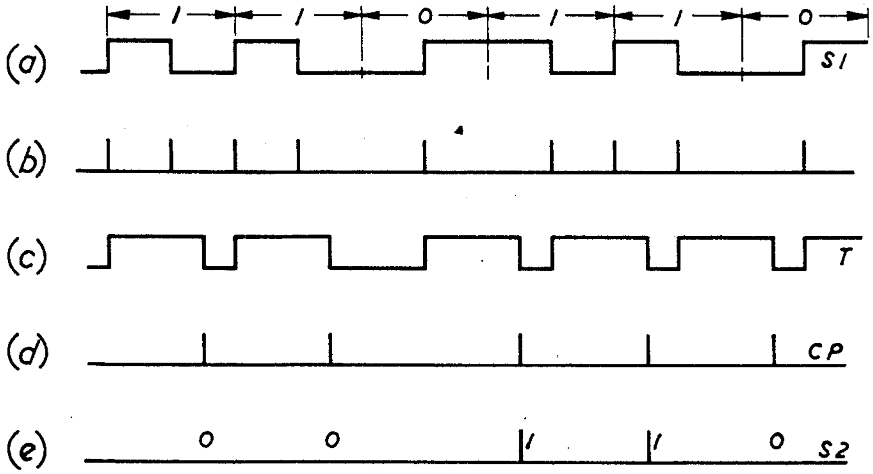

The arrangement shown in Figure 1 is suitable for use in a read output circuit reading digit signals out of a magnetic recording apparatus for example. These digit signals are produced by a read unit RU which gives an output train of binary digital signals S1 of the type described in patent specification No. 146,446. The voltage waveform of a typical train of digit signals 110110 produced by the read unit RU is shown in Figure 2(*a*). It will be seen that a digit signal 1 is a pulse signal in one form at a more positive voltage level during the first half of its allocated digit period and in another form at a more negative voltage level during the second half; while a digit signal 0 is represented by a pulse signal at the more negative voltage level during the first half and the more positive voltage level during the second half. The arrangement shown in Figure 1 can identify the first half of each digit period and can thus determine the nature of each digit signal by ascertaining the voltage level during the first half of its digit period.

The output S1 of the read unit RU is fed in parallel to a beginning element 1 and an end element 2 and hence to the setting connection of a trigger T which is thus supplied with a train of pulses as shown in Figure 2(*b*), in which a pulse occurs whenever the output S1 changes its voltage level. The output of the trigger T is applied to a beginning element 3 through a delay unit D which imposes a delay of ¾ of the digit period so that the beginning element 3 produces an output pulse ¾ of a digit period after the trigger T is set. This output pulse is applied to the resetting connection of the trigger T so that the trigger is reset ¾ of a digit period after it has been set. The output of trigger T is thus as shown in Figure 2(*c*) and the output from the element 3 which resets the trigger is as shown in Figure 2(*d*).

Assuming that Figure 2(*a*) shows the beginning of a train of digit signals, it will be seen that Figures 2(*a*)

and 2(c) illustrate the case where the trigger T is initially set at the beginning of each digit period and continues to be set as long as a triggering pulse is present at the beginning of each digit period. This will be so, as long as binary signals of one given type are being sent. When a binary signal is sent which is of a type different from that of the previous signal no triggering pulse occurs at the beginning of the digit period as there is no change in voltage level at this time. Thus if, as shown in Figures 2(a) and 2(c), the leading digit signals in the train are 110 and the trigger T is set at the beginning of the first two digit periods, the trigger is not set again until the middle of the following digit period as there was no triggering pulse at the beginning of the period.

Now whereas there may or may not be a triggering pulse at the beginning of each digit period there is always a triggering pulse at the voltage changeover time in the middle of each digit period, so once the trigger T is set at a mid-period time it will continue to be set at these times during successive digit periods provided it is not ready to be set at the beginning of the next digit period and is ready to be set by the middle of the next digit period. Hence the delay D may impose a delay of between about 0.6 and 0.9 of a digit period although the delay is preferably about 0.75 of a digit period.

Thus once two successive digit signals are of different types the trigger T sets and resets itself at times which bear a known time relationship to the digit periods, and any output of the trigger T may be used as required to mark given times during the digit periods. In the present case, the output of the beginning element 3, as shown in Figure 2(d) occurs, for all digit periods after the third digit period when the operation of the trigger T has been brought into its permanent time relationship with the digit periods, in the middle of the first half of each digit period. In the present arrangement this is the time at which the voltage level is required to be determined and this is readily done, as shown in Figure 1, by passing the signal output S1 through a coincidence gate G controlled by the output at the beginning element 3, which may be referred to as clock pulses CP.

The resulting output S2 as shown in Figure 2(e) consists of a train of pulse digit signals of the type in which a digit 1 is represented by the presence of a pulse during its digit period and a digit 0 by the absence of a pulse. Digit signals in this form can be readily used to operate circuit elements common to electronic digital computers.

It will be appreciated that, whereas Figures 2(a) to 2(e) illustrate a case in which the signal output shown in Figure 2(e) is false for the first two digit periods because the trigger T was initially set by a triggering pulse at the beginning of a digit period, in other cases when the trigger T is set initially in the middle of a digit period, the arrangement would maintain this correct timing relationship and there would be no initial false signal outputs.

In alternative forms of the arrangement shown in Figure 1, the output of the trigger T may be applied to a beginning element and delayed by ¼ of a digit period to produce a pulse which marks the middle of the second half of each digit period. An output of the trigger T delayed by ½ instead of ¼ of a digit period would mark the beginning of each digit period.

Figure 3:
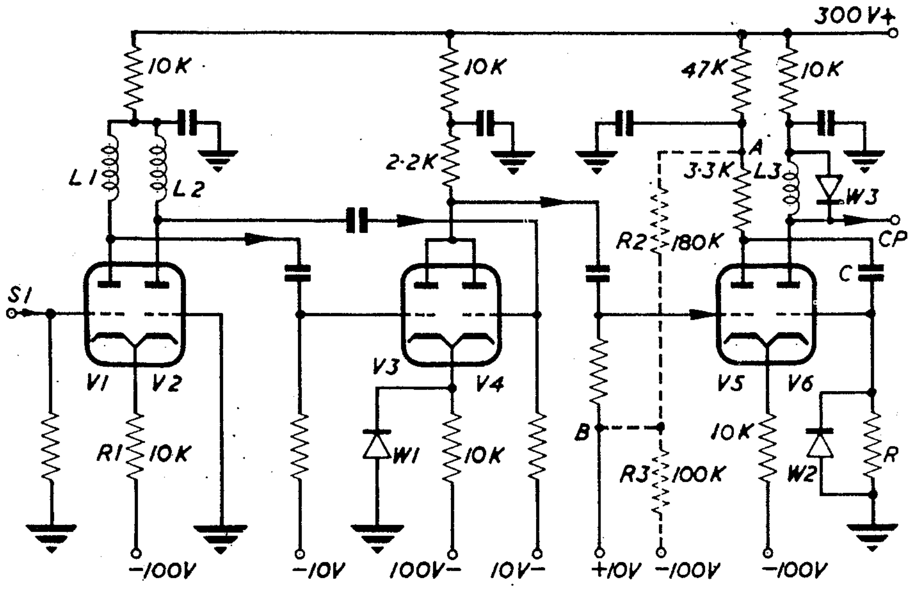
Figure 3 shows details of part of the circuit shown in Figure 1.

Figure 3 shows details of an electrical circuit for producing, from digit signals (such as S1) of the type described, timing pulses (such as clock pulses CP) having a predetermined timing relationship with these digit signals. The first part of the circuit consists of triode valves V1 and V2 provided with inductance coils L1 and L2 in their anode circuits respectively, and with a common cathode resistor R1. The grid of the valve V2 is maintained at earth potential and the digit signals S1 are applied to the grid of the valve V1 balanced about earth potential with the result that the valves V1 and V2 conduct in turn, the conducting valve changing in time with each change in the voltage of the signal S1. The differentiating coils L1 and L2 produce short-duration positive-going pulses in the anode potentials of the valves V1 and V2 when the valve concerned ceases to conduct.

These positive-going pulses are communicated to the grids of valves V3 and V4, which have common anode and cathode circuits. The common cathode point of these valves is prevented from falling below earth potential by the action of a rectifier W1 with the result that the valves V3 and V4 are cut off except when a positive-going pulse is communicated to the grid of either of the valves V3 and V4. When such a pulse is applied current is caused to flow through the common anode resistors and a negative-going pulse is produced on the common anode connection to the valves V3 and V4. The circuits involving the valves V1 to V4 which have now been described perform the function of the beginning and end elements 1 and 2 with the connections to them from the read unit RU and the connections from them to the trigger T as shown in Figure 1.

A double-triode valve V5 and V6 and its associated circuit elements performs the function of the trigger T and its resetting loop. The negative-going pulses on the common anode connection of the valves V3 and V4 (occurring at the same time as the positive-going pulses shown in Figure 2(b)) are applied to the grid of the valve V5 and, if it is not so already, cut the valve current off and cause the trigger to be set. This setting action is aided by a capacitor C connecting the anode of the valve V5 to the grid of the valve V6. A resistor R having a high resistance is connected between the grid of the valve V6 and earth in order to discharge the capacitor C. The rate of this discharge is arranged to be such that the potential on the grid of the valve V6 falls to a value at which the valve V6 begins to cut-off and the trigger resets after a delay of about ¾ of a digit period after it was rendered conducting. A rectifier W2 is connected between the grid of the valve V6 and earth potential in order to restore rapidly the potential level on this grid to earth potential so that the trigger can be set by the next negative-going pulse applied to the grid of the valve V5. Positive-going clock pulses CP are obtained from the anode of valve V6 by the action of the differentiating coil L3. Negative-going pulses which would be obtained when the trigger is set are suppressed by the action of the rectifier W3.

The trigger T shown in Figure 3 has a constant setting or on period and thus if there were a change in the signal repetition rate of the signal transmission the trigger would still reset ¾ of a standard digit period after it had set. An increased interval before the next digit signal occurs will not cause the trigger T to lose its correct time realtionship provided that the next digit signal was of a different kind to that of the preceding signal. In other cases, however, the correct time relationship may be lost and if changes in the signal repetition rate are likely to occur (such as when the digit signals are being read from a magnetic recording tape), it may be desirable to use a trigger T which resets after it has been set for about ¾ of the current digit period. Such a trigger may be in the form of the trigger circuit shown in Figure 3 modified by having the rectifier W2 removed and by connecting point A to point B through a resistor R2 (shown broken in Figure 3) to provide negative feedback for valve V5. Point B is then disconnected from the +10 v. supply and is connected to the −100 v. supply through a resistor R3 as shown in a broken line in Figure 3. If then, for example, the time taken by a digit signal were to increase so that the fraction of the digit period for which the trigger is set tends to diminish, the average potential on the point A would tend to fall as the valve V5 would tend to conduct for longer intervals. The fall in potential on the point A would be communicated to the grid of the valve V5 and the voltage on the grid of the valve V6 would be allowed to fall further while the capacitor C discharges, before the valve V6 cuts off, so that the time the trigger is set or on tends to be increased. Similar but reverse changes take place when the digit period shortens with the total result that the ratio of the on-off times of the trigger tends to be a constant ratio independent of the duration of the digit period.

It has already been pointed out that the timing of an arrangement such as that shown in Figure 1 for producing clock pulses CP from a train of digit signals of the type described may not be correct until a digit signal of one type is received following a digit signal of the other type. It is therefore necessary in order to make sure that the arrangement is working correctly before a train of signals is applied, to apply firstly a synchronising signal to the arrangement.

A suitable synchronising signal consists of a train of digit signals in which each digit signal differs from the preceding digit signal and is terminated by two successive signals of the same type. Such a synchronising signal is thus a train of digit signals . . . 10101011 or . . . 01010100. The succession of digit signals alternately one type and other type ensures that the timing of the arrangement is correct while the repetition of a digit signal of one type is used to mark the beginning of the message proper.

The arrangement shown in Figure 4 shows the arrangement shown in Figure 1 together with additional circuit arrangements for keeping the gate G closed until the end of the synchronising signal is recognised so that the synchronising signal, after having performed its function of ensuring the timing of the arrangement is correct, is not passed on with the message to the receiving circuits.

Figure 5:
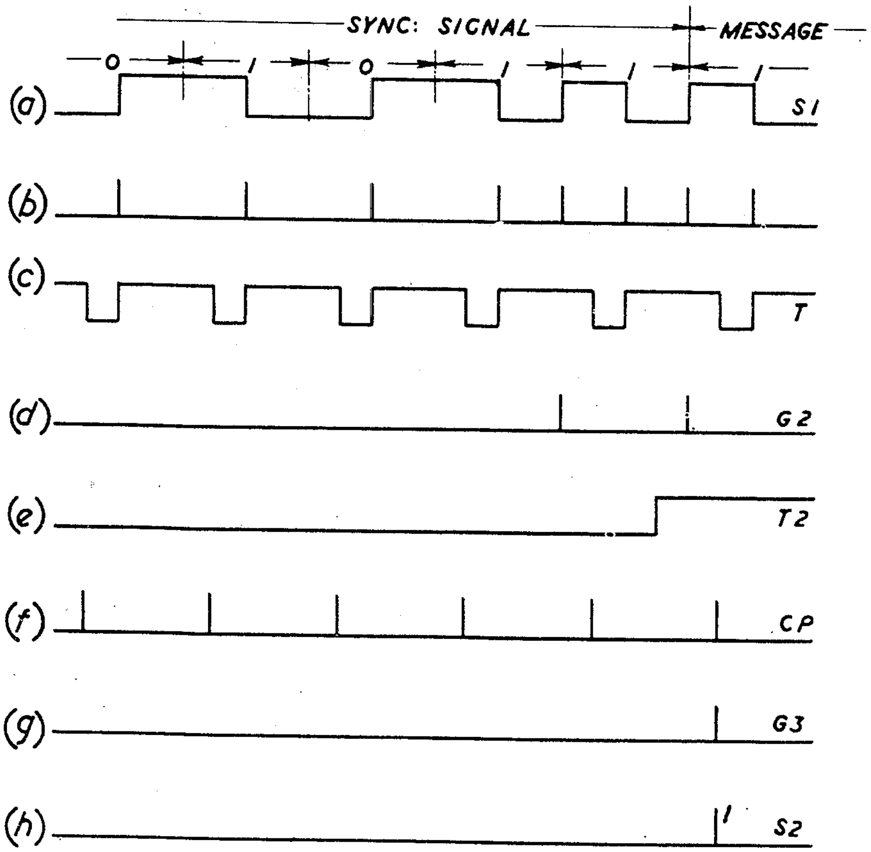

The additional circuits involve an and gate G2, a delay unit D2, a trigger T2 and another and gate G3. The combined output of the beginning and end elements 1 and 2 is applied to the gate G2. If the output S1 of the read unit RU consists of a synchronizing signal . . . 01011 immediately followed by a message of which the first digit is a 1 as shown in Figure 5(*a*), then the input applied to the gate G2 is a series of pulses as shown in Figure 5(*b*). Operating in a manner already described with reference to Figure 1, the trigger T, which also receives the series of pulses as shown in Figure 5(*b*), produces an output having a waveform as shown in Figure 5(*c*). This output of the trigger T, slightly delayed if necessary, is used to control the and gate G2 with the result that none of the pulses applied to the gate from the elements 1 and 2 are allowed to pass except those received at the beginning of a digit period. While the synchronizing signal is being received and successive signals are of different types there are no pulses received at these times. The first pulse to be received at the beginning of a digit period is at the end of the synchronizing signal when a signal of one type is repeated, and this is the first pulse output from the gate G2, as shown in Figure 5(*d*).

This output is passed through the delay unit D2 which delays the pulses by about ¾ of a digit period and is then applied to the trigger T2 which is thereupon set and produces an output as shown in Figure 5(*e*) which is applied to the gate G3. Clock pulses CP as shown in Figure 5(*f*), and produced as described in connection with Figure 1, are permitted to pass through the gate G3 only when the trigger T2 is on with the result that the first clock pulse to pass through the gate G3 is that which occurs during the first digit period of the message proper. This output of the gate G3, as shown in Figure 5(*g*), is applied to the gate G with the result that the output S2 of this gate is as shown in Figure 5(*h*).

It will be appreciated that in the arrangements shown in Figures 1 and 4 the delay units D and D2 may be placed after the beginning element 3 and the trigger T2 respectively.

I claim:

1. An electrical signalling arrangement comprising a source of a serial train of binary digit signals in which each 1 type binary digit signal is in a first form for the first half of its digit period and in a second form for the second half of its digit period while each 0 type digit signal is in the second form for the first half of its digit period and in the first form for the second half of its digit period, means for deriving a triggering pulse from the train of digit signals whenever the signal changes from one form to the other form, a trigger circuit arranged to be set by the next triggering pulse received after it has reset, to remain set for a time period which is more than half and less than a whole digit period and then to reset, and means for deriving clock pulses from an output of the trigger circuit which are in a known time relationship to each digit period after there has been two successive digit signals which are of different types.

2. An arrangement according to claim 1 and in which the said trigger circuit comprises a first trigger to which the said triggering pulses are applied so as to set the trigger, a delay unit and a beginning element to which the output of the trigger is applied and which as a result produces a short duration clock pulse more than half and less than a digit period after each time the trigger is set, and means for applying said clock pulses to a resetting connection of the trigger so as to reset the trigger, said clock pulses being in known time relationship to each digit period.

3. An arrangement according to claim 2 and comprising a first and gate circuit to which said triggering pulses are applied, a second trigger having a setting connection which the output from the first gate circuit is applied, a second and gate circuit to which are applied an output of the second trigger and said clock pulses produced from the output of the first trigger, and a delay unit in the path from the first and gate circuit to the second and gate circuit which imposes a delay sufficient to delay the opening of the second and gate until after the arrival of the first clock pulse to arrive after the time of opening of the first and gate.

4. An electrical signalling arrangement comprising a source of a serial train of binary digit signals in which each 1 type binary digit signal is substantially at a first voltage level for the first half of its digit period and is substantially at a second voltage level for the second half of its digit period while each 0 type digit signal is substantially at the second voltage level for the first half of its digit period and is substantially at the first voltage level for the second half of its digit period, means for deriving a triggering pulse from the train of digit signals whenever the voltage level changes from one voltage level to the other, a trigger circuit arranged to be set by the next triggering pulse received after it has reset, to remain set for a time period which is more than half and less than a whole digit period and then to reset, and means for deriving from an output of the trigger circuit which is produced when the trigger circuit changes its state signals which are in a known time relationship to each digit period after there has been two successive digit signals which are of different types.

References Cited in the file of this patent

UNITED STATES PATENTS

| | | |
|---|---|---|
| 2,609,143 | Stibitz | Sept. 2, 1952 |
| 2,633,564 | Flemming | Mar. 31, 1954 |